United States Patent Office 2,757,196
Patented July 31, 1956

2,757,196
L-3-(2-PROPYNYLTHIO)ALANINE

Mona Phyllis Doerner, Walnut Creek, Calif., assignor to The Dow Chemical Company, Midland, Mich., a corporation of Delaware No Drawing. Application April 11, 1955,
Serial No. 500,675

1 Claim. (Cl. 260—534)

The present invention is directed to L-3-(2-propynylthio)alanine of the formula

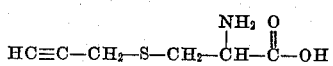

This compound is a crystalline solid somewhat soluble in many organic solvents and water. It is useful as an intermediate for the preparation of more complex organic derivatives and as an active toxic constituent of germicidal and disinfectant compositions for the control of many common fungal organisms such as *Alternaria solani* and *Sclerotinia cinerea*.

The new compound may be prepared by reacting 3-bromopropyne with the disodium salt of L-cysteine of the formula

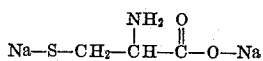

The reaction is carried out in liquid ammonia as reaction medium and at a temperature of from —70° C. to —33.3° C. Good results are obtained when employing substantially equimolecular proportions of the L-cysteine salt and 3-bromopropyne. The reaction may be controlled by adding the 3-bromopropyne dropwise to a suspension of the disodium cysteinate in liquid ammonia. The reaction takes place readily and when the 3-bromopropyne has all been added, the reaction mixture thereafter may be warmed gently to evaporate or distill off the liquid ammonia. The residue is then extracted with water to separate the sodium salt of L-3-(2-propynylthio)alanine. When the aqueous extract is brought to a pH of from 7 to 8, an L-3-(2-propynylthio)alanine product precipitates therein as a solid. During the neutralization it is preferred to keep the aqueous extract at a temperature of from about 0° to 10° C. Following the neutralization, the alanine product may be separated by filtration and further purified by redissolving in aqueous alkaline solution and thereafter reprecipitating by adjusting the pH of such solution to from 7 to 8.

In a representative operation, 48 grams (0.2 mole) of L-cystine was suspended with stirring in 800 milliliters of liquid ammonia. 18.5 grams (0.8 mole) of metallic sodium in small pieces was added portionwise to the above mixture to prepare a suspension of the disodium salt of L-cysteine in liquid ammonia.

48 grams (0.40 mole) of 3-bromopropyne was then added dropwise over a period of 30 minutes to the above suspension of the salt of L-cysteine. Following the addition, the reaction mixture was allowed to stand for 25 minutes and thereafter diluted with 10 milliliters of methanol. The diluted mixture was gently warmed to evaporate off the liquid ammonia, the residue extracted with water at 25° C., the aqueous extract filtered and the filtrate brought to a pH of about 7.5 by the addition of concentrated hydrochloric acid. During the neutralization, which was carried out at a temperature of about 5° C., an L-3-(2-propynylthio)alanine product precipitated in the mixture as light tan crystals. The latter product was separated by filtration and washed with water. The washed product was thereafter dissolved in aqueous 10 percent sodium hydroxide and reprecipitated therefrom by adjusting the pH to about 7.5 with concentrated hydrochloric acid. The reprecipitated product was separated by filtration, washed with water and dried. As a result of these operations there was obtained a 70 percent yield of an L-3-(2-propynylthio)alanine product melting with decomposition at 176°–178° C. and having a specific rotation $[\alpha]_D^{25}$ of —63.6°.

L-3-(2-propynylthio)alanine has been found useful as a fungicide and adapted to be applied to plants for the control of fungal pests such as *Alternaria solani*. In representative operations, substantially complete controls of this organism are obtained with aqueous compositions containing the L-3-(2-propynylthio)alanine compound, when such compositions are applied as a spray to plant foliage at dosages of 0.25 pound of the toxicant compound per 100 gallons of spray mixture.

I claim:
L-3-(2-propynylthio)alanine.

No references cited.